United States Patent [19]
Horiuchi

[11] 4,194,012
[45] Mar. 18, 1980

[54] FERMENTED FEED FOR RUMINANTS AND PROCESS FOR PRODUCING SAME

[76] Inventor: Isao Horiuchi, Kodan 5-101, Yabe-cho, 337 Tozuka-ku, Yokohama-shi, Kanagawa-ken, Japan

[21] Appl. No.: 788,442

[22] Filed: Apr. 18, 1977

[51] Int. Cl.² ............................................. A23K 1/12
[52] U.S. Cl. ...................... 426/53; 426/52; 426/60; 426/69; 426/635; 426/636; 426/807
[58] Field of Search ............... 426/49, 52, 53, 60, 426/62, 69, 636, 623, 626, 630, 635, 807

[56] References Cited

U.S. PATENT DOCUMENTS

| | | |
|---|---|---|
| 2,940,858 | 6/1960 | Flechsig ................... 426/53 |
| 3,259,501 | 7/1966 | Ulrey ...................... 426/807 |
| 3,796,809 | 3/1974 | Miller et al. ............... 426/53 |
| 4,055,666 | 10/1977 | Jeffreys et al. ............ 426/60 |
| 4,082,859 | 4/1978 | Katzen ..................... 426/636 |

Primary Examiner—R. B. Penland
Attorney, Agent, or Firm—Lane, Aitken & Ziems

[57] ABSTRACT

A feed for ruminants is produced by mixing 90–99.5% by weight of a vegetable fiber material which is indigestible by ruminants and 0.5–10% by weight of a non-protein nitrogen compound and inoculating the mixture with an effective amount of an alcoholic fermentation micro-organism, an organic acid fermentation microorganisms or an ester formation microorganisms and fermenting the inoculated mixture.

2 Claims, No Drawings

FERMENTED FEED FOR RUMINANTS AND PROCESS FOR PRODUCING SAME

BACKGROUND OF THE INVENTION

The present invention relates to a feed for ruminants which is produced by using as the main raw material vegetable fiber materials which ruminants are incapable of digesting, and to the process for producing same.

Assorted feeds (concentrated feeds) which have been produced as livestock feeds, are generally designed so as to contain calculated amounts of nutritious substances needed by animals, and usually the content of solid fiber materials is relatively low.

Feeds taken by ruminants such as cattle and sheep stay in their paunch (anterior stomach, i.e. the rumen-reticulum) for a relatively long period of time. Meanwhile, they are moderately mixed by gastric motion, fermented by the action of various bacilli and enzymes in the paunches and finally absorbed as nutrious substances. However, when the content of solid fiber materials in the above feeds is too low, such digestive mixing and fermentation cannot be adequately carried out, thus creating various problems. Therefore, in case of foddering ruminants with assorted feeds, it is necessary to blend most feeds with crude or rough feeds mainly composed of solid fiber materials.

Further, it is required that such crude feeds not only contain a sufficient amount of solid fiber materials but also that they be digestible. Grass or pasture is a suitable fiber-containing crude feed, but in some cases it may be replaced with rice straw which is comparatively digestible by ruminants.

However, because of recent shortages and rise in the prices of these feed resources, it has become desirable from the viewpoint of livestock management to utilize as crude feeds various vegetable fiber resources such as sawdust and waste paper which have not previously been successfully used as livestock feeds. Toward this end, many attempts have been made but to date use of such indigestible vegetable fiber materials as livestock feed has proven impractical because they are indigestible and do not have suitable taste. For example, a crude livestock feed has been prepared by fermenting sawdust in the presence of *Bacillus subtilis*. The crude feed thus obtained has an improved taste and can be used together with grass or pasture to increase the quantity of livestock feeds. However, it lacks nutritional value and otherwise has little value as to livestock feed because its indigestibility is no better than the sawdust from which it is produced. Moreover, the livestock feed thus obtained is expensive, because the fermentation of sawdust takes a considerable period of time and requires a troublesome mixing operation and special apparatus.

Further, there is known another process for producing a crude feed, where more or less hard vegetable fiberous materials such as rice hulls are treated with ammonia at a high pressure within the range of about 80 to 100 atm. to destroy their fiber structure. However, the above process has little utility because it requires special and large-scale apparatus which can stand the unusually high temperature and pressure. It is also possible to produce a crude livestock feed by mixing assorted feeds with the above-mentioned indigestible vegetable fibers. However, the serious drawback of low nutritional value remains. Additionally, extremely hard vegetable fibers such as wood chips cannot be added to assorted feeds.

SUMMARY OF THE INVENTION

The present invention provides a feed for ruminants by mixing 90.0–99.5% by weight of vegetable fiber materials which are not digestible by ruminants and 0.5–10% of non-protein nitrogen compounds and inoculating the mixture with an effective amount of one or more fermentation microorganisms selected from the group consisting of alcoholic fermentation microorganisms, organic acid fermentation microorganisms and ester formation microorganism.

Accordingly, it is an object of the present invention to convert various fibrous vegetable waste materials to a form suitable for use as a livestock feed.

It is another object of the invention to produce a highly digestible livestock feed high nutritive value from such waste materials.

Other objects of the present invention will become apparent from a reading of the following detailed description and claims.

DETAILED DESCRIPTION OF THE PREFERRED EMBODIMENTS

Fibrous vegetable materials which are suitable for use as starting materials in the process of the present invention include "hard" materials such as wood chips, sawdust, saw powder, waste paper, rice hulls, peanut shells and bagasse which are essentially indigestible by ruminants and vegetable fiber materials such as rice straw and wheat straw which are only slightly digestible by ruminants.

These vegetable fiber materials can be used without any pretreatment. However, where one of the "hard" vegetable fiber materials is used, it is desirable to soften it by alkali pretreatment, which is carried out as follows. The hard vegetable fiber material is soaked at room temperature in an alkali solution such as aqueous caustic soda or an ammonia solution, and then introduced into a pressurized autoclave, wherein it is cooked at a pressure in the range of 4–6 atmospheres. The cooked material is then washed with water and if required neutralized with an aqueous solution of a weak acid such as carbonic acid or sulfurous acid.

In this alkali pretreatment, the alkali solution reacts with the methoxy groups of the lignins contained in the vegetable fiber materials to solublize and elute the lignins. The alkali permeates into the middle lamella interconnecting the fibers, and into the primary fiber membrane and swells and softens them, thus destorting the fiber structure. The vegetable fiber materials which have been softened and distorted by the alkali solution are then mechanically crushed and fibrillated by means of a disc refiner or the like. In this process the distorted parts are destroyed, a part of the primary membrane adheres to the neighboring fibers and the other part forms the fine fibers. Thus the "hard" vegetable fiber materials are converted into cotton-like, softened fiber materials. Further, since the primary membrane is peeled off and the scarcely ligninized secondary membrane is exposed during this alkali pretreatment, the pretreated fiber materials are easily fermentable and they can be easily digested in the rumen-reticulum of the livestock animal.

When coarse materials such as wood chips are used as the fiber materials, it is desirable to crush or refine them after cooking.

The content of the vegetable fiber materials in the above-mentioned mixture is preferably about 90.0–99.5% by weight and more preferably 93–98% by weight. If the amount of such vegetable fibrous material exceeds 99.5%, the percentage of digestible nutritious substances are in the mixture as a whole is reduced to the point where desirable increases in body weight cannot be obtained. On the other hand, if the amount is less than 90% there is insufficient fiber to fulfill the desired digestive mixing function in the paunches of livestock.

Non-protein nitrogen compounds suitable for use in the present invention include urea-type nitrogen compounds such as urea, biuret and diureido isobutane and ammonia-type nitrogen compounds such as ammonium acetate, ammonium butyrate, ammonium carbonate, ammonium lactate, and ammonium phosphate. These nitrogen compounds are decomposed by the fermentation microorganisms in the fermentation step and used as nutriments for the symbiotic microflora of the rumen-reticulum. In the rumen-reticulum these microorganisms transform the nonprotein nitrogen compounds into protein.

The content of the nonprotein nitrogen compounds in the above-mentioned mixture is preferably about 0.5–10%, and more preferably 2–7% by weight. If it exceeds 10%, crude protein becomes superabundant and in some cases it may be drawn off as urine. Conversely, if it is less than 0.5%, crude protein becomes insufficient and a satisfactory increase in body weight may not be achievable. Further, according to the present invention, other effective components can be added to the above-mentioned mixture in order to heighten the nutritive value and taste of the final product to such an extent that the use of other feeds is unnecessary. Such optional effective components, include grains, chaff and bran, fermentation accelerators such as molasses, calcium carbonate, calcium secondary phosphate (dibasic calcium phosphate) and the like. The nutritive value and taste of the final product are remarkably heightened by adding 3–100 parts of grain and 3–100 parts of chaff and bran per 100 parts of the mixture. The action of the fermentation microorganisms is accelerated by adding 3–100 parts of a fermentation accelerator such as molasses. Further, calcium carbonate, calcium secondary phosphate or a mixture thereof acts as an effective promoter of the growth of skeletal structures, when added in the amount of 0.3–5 parts per 100 parts of the fermentation mixture. Additionally, calcium secondary phosphate plays an important part in regulating the pH in blood and in the ruminant's stomach.

Alcoholic fermentation microorganisms which are suitable for inoculation of the mixed starting material include species of genus Saccharomyces such as *Saccharomyces cerevisiae* (yeast), *Saccharomyces sake, Saccharomyces carlsbergensis, Saccharomyces diastaticus, Saccharomyces pastorianus,* and *Saccharomyces rouxii;* genus *Schizosaccharomyces* such as *Schizosaccharomyces pombe,* and *Schizosaccharomyces octosporus;* some species of genus Candia; and some species of genus Aspeigillus (molds). Suitable organic acid fermentation microorganisms, include species of genus Brettanomyces, genus Endomycopsis, genus Hansenula, genus Candida, genus Rhodotorus, genus Lactobacillus (bacteria), e.g. *Lactobacillus hiochii,* genus Pediococcus, propionic acid bacteria, and acetic acid bacteria. Further, suitable ester formation microorganisms include *Hansenula anomala* and species of genus Ceotrichum.

Any of the foregoing fermentation microorganisms may be used after exposure to radioactive rays such as $\alpha$-ray, X-ray and ultra-violet ray to strengthen their fermentability.

The feed for ruminants of the present invention is produced by inoculating the mixture containing the vegetable fiber materials, which cannot be digested by ruminants, and a non-protein nitrogen compound or compounds with an effective amount of one of aforementioned fermentation microorganisms or a combination of an alcoholic fermentation microorganism with an organic acid fermentation microorganism and then stationarily cultivating the mixture for at least 18 hours, preferably 20–24 hours, under conditions of temperature and humidity suitable for accelerating the action of the particular fermentation microorganisms selected for use.

By using a combination of an alcoholic fermentation microorganism with an organic acid fermentation microorganism or by using an ester formation microorganism, esters are formed in the feed and its taste is remarkably improved.

The feed for ruminants of the present invention is of high nutritive value and easily digestible in the paunches of ruminants, because a large quantity of fermentation microorganisms multiplied in the cultivating step have permeated into the fiber structures.

The fiberous content of the present invention is sufficient to provide for mixing the feed in the paunches of ruminants. Therefore, this feed can be used not only as a feed additive but also as the sole feed.

In the following examples the term "humidity" means relative humidity.

EXAMPLE 1

One hundred ml of an alcoholic fermentation microorganism, *Saccharomyces cerevisiae* was inoculated into a mixture of 70 kg of sawdust, 5 kg of molasses, 4 kg of urea and 20 l of water, and stationary cultivation was carried out at 25° C. and 70% humidity for 24 hours.

The above amount of feed was supplied as a day's ration to 100 head of cattle, each head of cattle initially weighing 200–300 kg, for three straight months. As a result, the mean increase in body weight was found to be 0.5 kg/day. As a control, a mixture obtained by mixing 80 kg of a commonly used mixed feed[1] and 15 kg of a crude livestock feed (rice straw) was supplied to another 10 head of cattle approximately equal body weight and the mean increase in body weight was found to be 0.8 kg/day. Although the mean increase in body weight was inferior to that of the control, the test demonstrated that growth of cattle is possible even if the feed of the present invention is only feed.

[1] The "mixed feed" used in this example and throughout the examples was "KINGBEEF" marketed by Zenkoku Nogyo Kyodo Kumiai.

EXAMPLE 2

One hundred ml of an organic acid fermentation microorganism, *Endomycopsis fibuligere* was inoculated into a mixture (total 96 kg) prepared by mixing 50 kg of sawdust, 17 kg of wheat bran, 10 kg of rice bran, 10 kg of rolled barley, 5 kg of molasses, 2 kg of urea, 1.5 kg of calcium secondary phosphate, and 0.5 kg of calcium carbonate together with a proper amount of water. Then "stationary cultivation" was carried out at 25° C. and 70% humidity for 24 hours.

The feed thus obtained was supplied to the same test animals as in Example 1 and as a result the increase in body weight was found to be 1.20 kg/day.

EXAMPLE 3

Two different fermentation microorganisms, 50 ml of *Saccharomyces cerevisiae* and 50 ml of *Endomycopsis fibuligere* were inoculated into a raw material mixture identical to that of Example 2 and stationary cultivation was carried out in the same manner as in Example 2.

Likewise, the same feed was supplied under the same conditions to 10 head of cattle having 400-500 kg body weight with a resulting increase in body weight of 1.5 kg/day.

On the other hand, the increase in weight for the control group fed the same mixture of a mixed feed and crude feed as in Example 1 was 1.20 kg/day.

EXAMPLE 4

A raw material (wood chips) was soaked in an aqueous solution of sodium hydroxide at room temperature for 24 hours. Then the raw material and the aqueous solution were introduced into an alkali-containing, pressurized autoclave and cooked under a pressure in the range of 4-6 atm. at 135° C. for 40-60 minutes. After cooking, the wood chips were washed with water, neutralized and refined by means of a disc refiner. To 70 kg of this pretreated raw material were added 3 kg of urea, 5 kg of molasses (fermentation accelerator), and 22 l of water to form a fermentation mixture or medium. One hundred ml of an alcoholic fermentation microorganism, *Saccharomyces cerevisiae* was inoculated into the mixture obtained above the stationary cultivation was carried out at 25° C. and 50% humidity for 24 hours.

The above amount of the thus-prepared feed was fed as a day's ration to 10 head of cattle, each weighing 200-300 kg, for three straight months. The resulting mean increase in body weight was found to be 0.8 kg/day.

For comparison, another feed was prepared in the same manner as described above (this Example) except that the sawdust used was not pretreated with alkali, and fed to control animals. As a result, the increase in body weight was found to be only 0.5 kg/day.

EXAMPLE 5

Two different fermentation microorganisms, 50 ml of *Saccharomyces cerevisiae* and 50 ml of *Endomycopsis fibuligere* were inoculated into a mixture prepared by mixing the alkali pretreated sawdust with other raw materials in the same manner as in Example 4 and cultivating the stationary mixture.

The feed thus obtained was supplied to the same test animals as in Example 4 and as a result the increase in body weight was found to be 0.8 kg/day.

EXAMPLE 6

Two fermentation microorganisms, 50 ml of *Saccharomyces cerevisiae* and 50 ml of *Endomycopsis fibuligere* were inoculated into a mixture (total weight 96 kg) prepared by mixing 50 kg of sawdust (alkali pretreated as in Example 4), 17 kg of wheat bran, 10 kg of rice bran, 10 kg of rolled barley, 5 kg of molasses, 2 kg of urea, 1.5 kg of calcium secondary phosphate, 0.5 kg of calcium carbonate and a proper amount of water. Stationary cultivation was carried out at 25° C. and 70% humidity for 24 hours. The feed thus obtained was supplied to the same test animals as in Example 4 and as a result the increase in body weight was observed to be 1.5 kg/day. The total effective digestion number (TDN) of the sawdust was 25%.

EXAMPLE 7

50 kg of an alkali pretreated raw material (wood chips), were mixed with 11 kg of rolled barley, 20 kg of wheat bran, 10 kg of rice bran, 2 kg of urea, 0.5 kg of calcium carbonate, 1.5 kg of calcium secondary phosphate, 5 kg of molasses, and a proper amount of water. Then 50 ml of an alcoholic fermentation microorganism, *Saccharomyces cerevisiae* and 50 ml of an organic acid fermentation microorganism, *Endomycopsis fibuligere* were inoculated into the mixture and cultivation was carried out for 24 hours.

The above amount of fermented feed was fed as a day's ration to 10 head of Holstein (beef cattle) and the mean increase in body weight was found to be 1.35 kg/day.

For comparison, a mixture of a commonly used mixed feed (assorted feed) and crude feed (wheat straw and grass) was supplied to control animals whereupon the increase in body weight was found to be 1.20 kg/day.

EXAMPLE 8

*Saccharomyces cerevisiae* and *Endomycopsis fibuligere* were inoculated into a mixture of 70 kg of sawdust (alkali pretreated as in Example 4), 10 kg of rolled barley, 10 kg of wheat bran, 10 kg of rice bran, 0.5 kg of calcium carbonate, 1.5 kg of calcium secondary phosphate, 2 kg of urea, and 5 kg of molasses, and the mixture was fermented at 25% and 70% humidity for 24 hours.

The feed thus obtained was supplied to the same test animals as in Example 7 and the increase in body weight was found to be 1.2 kg/day.

What is claimed is:

1. A process for producing a feed for ruminants which comprises the steps of:
    (a) mixing about 90-99.5% by weight of a wood fiber material which is not digestible by ruminants and which is selected from the group consisting of wood chips, sawdust, sawpowder, waste paper, and mixtures thereof, and 0.5-10% by weight of a non-protein nitrogen compound;
    (b) inoculating the mixture with an effective amount of an ester producing microorganism or the combination of an organic acid producing microorganism and an alcohol producing yeast, whereby esters are formed in said feed by fermentation; and
    (c) cultivating said ester producing microorganism or said combination in said mixture for at least 18 hours.

2. The process of claim 1, additionally comprising, prior to step (a), impregnating the vegetable fiber material with an alkali to soften the fiber.

* * * * *